United States Patent [19]
Fukumoto et al.

[11] 3,878,191

[45] Apr. 15, 1975

[54] PROCESS FOR PREPARING SOLUBLE FLAVONOID GLYCOSIDES

[75] Inventors: Juichiro Fukumoto, Takarazuka; Shigetaka Okada, Nara, both of Japan

[73] Assignee: Kyowa Hakko Kogyo Kabushiki Kaisha, Tokyo-to, Japan

[22] Filed: Feb. 7, 1972

[21] Appl. No.: 224,253

[30] Foreign Application Priority Data
Feb. 19, 1971  Japan.................................. 46-7356

[52] U.S. Cl................ 260/210 F; 195/28; 426/190; 426/321; 426/365
[51] Int. Cl......................... C07c 15/12; C08b 19/00
[58] Field of Search.................................. 260/210 F

[56] References Cited
UNITED STATES PATENTS
3,087,821    4/1963   Horowitz et al................. 260/210 F

*Primary Examiner*—Johnnie R. Brown
*Attorney, Agent, or Firm*—Phillips, Moore, Weissenberger, Lempio & Strabala

[57]  ABSTRACT

Modified flavonoid glycosides are prepared wherein the molecules include two or more glucose substituents. Such modified flavonoid glycosides exhibit uniquely higher solubilities than the unmodified compounds. Modification is achieved by reacting flavonoid monoglycosides with starchy materials in the presence of $\alpha$-amylase enzymes. The resultant flavonoid glycosides include principally two or three glucose substituents per molecule. Further reaction of the modified glycosides with $\beta$-amylase gives rise to decomposition of the glycoside having a high polymerization degree and a flavonoid glycoside having two or three glucoses per molecule is solely obtained.

5 Claims, No Drawings

PROCESS FOR PREPARING SOLUBLE FLAVONOID GLYCOSIDES

BACKGROUND OF THE INVENTION

It has been reported that dihydrochalcon glycosides obtained from flavonol compounds such as e.g. naringin, hesperidin and the like by ring-opening with alkali, have an agreeable sweet taste and can be produced without difficulty. Because of these facts, their use for new synthetic sweetening agents has been widely considered.

Among such glycosides, those having one glucose such as e.g. hesperidin dihydrochalcon monoglucoside, prunin dihydrochalcon monoglucoside can be produced with ease on an industrial scale, but on the other hand they have the disadvantage of extremely low solubilities. For example, hesperidin dihydrochalcon monoglucoside dissolves to the extent of only about 0.1% at a room temperature of 18°C. Thus, such glycosides have a major drawback for use as practical synthetic sweetening agents.

BRIEF SUMMARY OF THE INVENTION

The present invention relates to flavonoid glycosides and more particularly to soluble flavonoid glycosides.

More specifically it has now been determined that when amylase which has been recognized as an enzyme capable of hydrolyzing starch is present in a system for the reaction of starch with flavonoid monoglycoside, a part of starch is transferred to the C-4 position of the glycoside so as to form correspondingly a specific compound. According to the present invention, flavonoid glycosides containing at least two glucoses are novel sweetening agents of high solubility. These compositions are prepared by the action of $\alpha$-amylase on a mixed solution of a flavonoid monoglycoside (e.g. dihydrochalcon monoglucoside) and starch which acts as a sugar donor whereby sugar is transferred from the sugar donor to the flavonoid monoglycoside. A decomposed product of the starch may also be used as the sugar donor.

It is therefore an object of the invention to provide flavonoid glycosides of high solubility.

A further object of the invention is to provide soluble flavonoid glycosides having at least two glucoses in the molecule.

Another object of the invention is to provide a method for producing soluble flavonoid glycosides.

Other objects and advantages of the invention will become apparent from a review of the following specification and appended claims.

DETAILED DESCRIPTION OF THE INVENTION

The flavonoid monoglycosides which may be employed in the present invention are exemplified by hesperetin-7-glucoside, citronin-7-glucoside, naringenin-7-glucoside (prunin), sakuranetin-5-glucoside, isosakuranetin-7-glucoside, and the like. Generally those glucosides which belong to flavonoid monoglycoside may be utilized. It is also possible to use both chalcon and dihydrochalcon compounds of the above mentioned flavonoid monoglucosides for the purpose of the present invention.

As the amylase enzymes any and all $\alpha$-amylases may be used. It is preferred to use, for example, bacterial saccharifying $\alpha$-amylases, $\alpha$-amylases of fungi and $\alpha$-amylase obtained from *Bacillus macerans* etc. because of their high conversion efficiency. However, bacterial liquefying $\alpha$-amylases, $\alpha$-amylase of malt etc. are less efficient, and are generally not practical for use in the invention process.

The term "$\alpha$-amylase" used in the present specification denotes the general term for the enzymes which are able to act on starch and dextrin to hydrolyze $\alpha$-1,4-glycoside at random, and which includes various enzymes acting on starch to produce the transfer of a glycosyl group. Such amylases are exemplified by the amylase of *Bacillus macerans*, glycosyltransferase of *Bacillus subtilis* etc.

As the sugar donor, various starches such as e.g. soluble starch, liquefied dextrins obtained by acid or enzymatic decomposition, and cyclodextrin may preferably be used.

The process of the present invention is advantageously carried out in the following manner.

Flavonoid monoglycoside is added to a 1–30% solution of a sugar donor, i.e. starch or starch decomposate such as e.g. cyclodextrin, liquefied dextrin (when not completely dissolved, dissolved previously in e.g. ethanol). The amount of the monoglycoside is adjusted to give a ratio of starch (or decomposate thereof) to glycoside of at least 1:1; however, preferably the amount of starch (or decomposate thereof) exceeds the amount of glycoside. $\alpha$-amylase, preferably diluted with water, is added to the mixture and the reaction is carried out for one to two days at a pH of 4.0–8.0 and at a temperature of 30°–60°C. The reaction mixture is heated to from about 80° to about 90°C for about 10 minutes to inactivate the enzyme and the product is then dried to yield a sweetening agent, i.e. novel flavonoid glycosides containing two or more glucoses and having a high solubility.

$\beta$-amylase may be additionally used to act on the reaction mixture described just above. With such additional reaction the glycoside having a high polymerization degree is decomposed and a flavonoid glycoside having two or three glucoses is solely obtained. The reaction and inactivation of $\beta$-amylase are carried out in a similar manner to that described in relation to the $\alpha$-amylase.

The flavonoid glycosides obtained by the present invention have almost the same degree of sweetness as that of the original monoglycosides, but they tend to exhibit somewhat milder effects.

An apparent from Table 1, which shows about a tenfold increase in solubility without the occurence of crystalization even in about 1% solution, the products obtained by the present invention are very useful in practice.

The solubility of the products obtained by the present invention are 5% at 20°C, 10% at 22°C and 20% at 25°C. The maximum ultra-violet absorbances in 20% methanol solution and Rf values obtained by paper chromatography using a solvent system containing butanol, acetic acid and water (4:1:5) for the development of various substances composing the glucosides are shown in Table 2.

Table 1

| Solubility of Hesperetin Dihydrochalcon Glucoside | | | | | |
|---|---|---|---|---|---|
| Substance | \multicolumn{5}{c}{Concentration} | | | | |
| | 1% | 0.5% | 0.25% | 0.125% | 0.06% |
| Hesperetin dihydrochalcon | | | | | |

Table 1-Continued

| Substance | Solubility of Hesperetin Dihydrochalcon Glucoside Concentration | | | | |
|---|---|---|---|---|---|
| | 1% | 0.5% | 0.25% | 0.125% | 0.06% |
| monoglucoside | ++ | ++ | + | + | − |
| Products of the present invention | − | − | − | − | − |

Note:
1) Aqueous solutions of each concentration were prepared and left for a night at a room temperature of 10°C. After this, the formation of precipitates was observed.

2) ++ and + : forming precipitates
   − : forming no precipitates

Table 2

Maximum absorbance and Rf value of hesperetin dihydrochalcon glucosides

| | Maximum absorbance | Rf value |
|---|---|---|
| Agricon | 282mμ | 0.84 |
| Monoglucoside | 282 | 0.64 |
| Diglucoside | 282 | 0.40 |
| Triglucoside | 282 | 0.16 |
| Tetraglucoside | 282 | 0.11 |
| Pentaglucoside | 282 | 0.045 |

The examples of the formulas of the preferable multi-substituted glucose glycosides are as follows:

The following nonlimitative examples illustrate the invention.

EXAMPLE 1

2 grams of hesperetin dihydrochalcon-7-glucoside was dissolved in 20 ml of methanol with heating. Separately, 5 g of soluble starch was dissolved in 50 ml of water with heating and was thereafter decomposed by adding a bacterial liquefying α-amylase obtained from *Bacillus subtilis*. When the decomposition ratio became about 18%, the starch-α-amylase mixture was heated to give a digested starch solution having a decomposition ratio of about 20%. Subsequently, both solutions were combined and 30 ml of amylase obtained from *Bacillus macerans* was added thereto. The mixture was reacted for 16 hours at 40°C and at pH 5.6.

The resultant liquor was heated for 5 minutes at 90°C to inactivate the enzyme and was then spray-dried to yield 6 g of powdered flavonoid glycosides. The product was in the form of a mixture of glucose, maltose and maltotriose as well as of mono-, di-, tri-, tetra- and pentaglucosides. The ratio of respective mono-, di-, tri-, tetra- and pentaglucosides was 1:2:2.5:1.5:0.7.

EXAMPLE 2

2 grams of hesperetin dihydrochalcon-7-glucoside was dissolved in 20 ml of methanol with heating. Separately, 5 g of cyclohexadextrin was dissolved in 50 ml of water with heating and was combined with the hes-

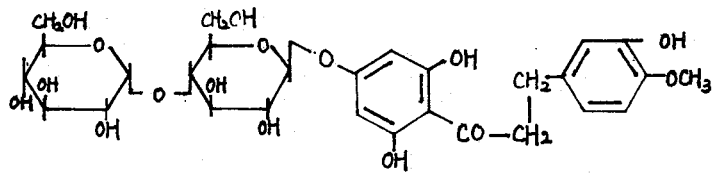

Hesperetin dihydrochalcon-7-maltoside

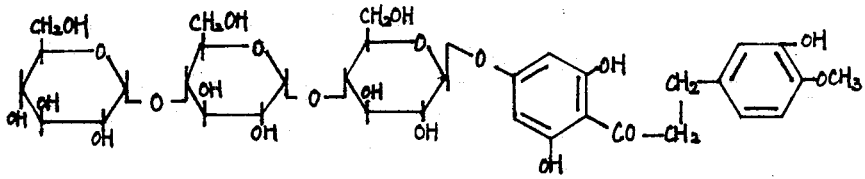

Hesperetin dihydrochalcon-7-maltotrioside

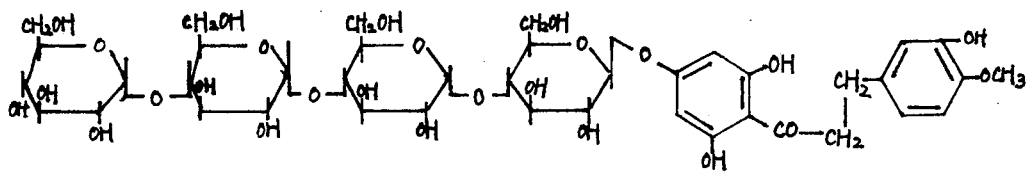

Hesperetin dihydrochalcon-7-maltotetraoside peretin dihydrochalcon-7-glucoside solution, to which 30 ml of an amylase obtained from *Bacillus macerans* was added. Reaction was carried out for 16 hours at 50°C at pH 5.5. Subsequently, the reaction mixture was heated for 5 minutes at 90°C to inactivate the enzyme.

To the first reaction mixture was further added 20 ml of β-amylase extracted from bran and the reaction was carried out for 4 hours at 50°C at pH 5.5. The second reaction liquor was subjected to heat treatment for 10 minutes at 80°C and was dried in vacuo. The dried material was dissolved in absolute ethanol and the solvent was evaporated off under reduced pressure to yield 0.5 g of flavonoid glycoside. The product obtained contained small amounts of sugars such as glucose, maltose, etc. and was in the form of a mixture of mono-, di-, and triglucoside at a ratio of 1:3:3.

EXAMPLE 3

2 grams of naringenin-7-glucoside was dissolved in 20 ml of methanol with heating and was mixed with 100 ml of a 10% solution of soluble starch.

To the solution was added 10 ml of a bacterial saccharifying α-amylase and the reaction was carried out for 16 hours at 50°C at pH 5.5. The reaction mixture was heated for 10 minutes at 80°C to inactivate the enzyme and extracted several times with ethyl acetate. The solvent was evaporated off under reduced pressure to yield 2 g of a white powder of flavonoid glycoside. The product obtained was a mixture of mono-, di-, tri- and tetraglucosides at a ratio of 1:2:2:0.5.

EXAMPLE 4

5 grams of isosakuranetin-7-glucoside was mixed with 200 ml of a 10% wheat starch solution, to which 10 ml of an α-amylase obtained from *Aspergillus niger* was added. The reaction was carried out for 16 hours at 50°C at pH 5.5. After the completion of the reaction, the mixture was further heated for 5 minutes at 90°C to inactivate the enzyme and was spray-dried to yield 3 g of a powder of flavonoid glycosides.

What is claimed is:

1. A soluble flavonoid glycoside containing between 2 and 5 glucose substituents per molecule and wherein said substituents are glucoses selected from the group consisting of hesperetin-7-glucoside, citronin-7 glucoside, naringenin-7-glucoside, sakuranetin-5-glucoside, isosakuranetin-7-glucoside, and chalcons and dihydrochalcons thereof.

2. The flavonoid glycoside of claim 1 wherein said glycoside is hesperetin dihydrochalcon-7-maltoside.

3. The flavonoid glycoside of claim 1 wherein said glycoside is hesperetin dihydrochalcon-7-maltrioside.

4. The flavonoid glycoside of claim 1 wherein said glycoside is hesperetin dihydrochalcon-7-maltotetraoside.

5. The flavonoid glycoside of claim 1 wherein said glycoside is hesperetin dihydrochalcon-7-maltopentaoside.

* * * * *

UNITED STATES PATENT AND TRADEMARK OFFICE
CERTIFICATE OF CORRECTION

PATENT NO. : 3878191
DATED : April 15, 1975
INVENTOR(S) : Juichiro Fukumoto et al It is certified that error appears in the above-identified patent and that said Letters Patent are hereby corrected as shown below:

Page 7 of the application, which consisted solely of the table below, was omitted from the Patent when printed.

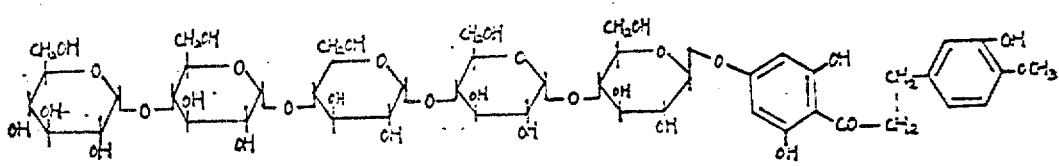

Hesperetin dihydrochalcon-7-maltopentaoside

Signed and sealed this 15th day of July 1975.

(SEAL)
Attest:

RUTH C. MASON
Attesting Officer

C. MARSHALL DANN
Commissioner of Patents
and Trademarks